Patented Apr. 12, 1932                                                                1,853,818

UNITED STATES PATENT OFFICE

WILLIAM H. KOBBÉ, OF NEW YORK, N. Y., ASSIGNOR TO TEXAS GULF SULPHUR COMPANY, OF BAY CITY, TEXAS, A CORPORATION OF TEXAS

FIRE-PROOFING SULPHUR

No Drawing.          Application filed June 25, 1931.   Serial No. 546,920.

This invention relates to the fire-proofing of sulphur, and more particularly to a method of fire-proofing sulphur and the product thereof.

The combustible nature of elemental sulphur imparts an objectionable characteristic to its use in various industrial applications, one particular example of which is found in the case of certain sulphur-treated products wherein the sulphur is present in an inflammable porous material. In such products, moreover, the combustibility of the sulphur appears to be appreciably heightened, with an attendant increase in the fire hazard. This is notably the case with porous pulp and paper products, wood and similar inflammable porous materials which have been impregnated or otherwise treated with elemental sulphur.

In addition to the generally objectionable nature of the potentially destructive fire hazard, the noxious and suffocating character of the gases which accompany a sulphur fire greatly augment the desirability of inhibiting its combustion.

It is an object of my invention to render elemental sulphur relatively incombustible and protected against the destructive action of fire thereupon, these two effects being embraced by the comprehensive term "fireproof".

It is a further object of my invention to provide a fire-proofing agent for the sulphur which is capable of being easily and effectively applied thereto.

With respect to this last noted object, it is a particular aim of my invention to provide a fire-proofing agent which has the property of forming a uniform liquid mixture with molten sulphur, a property of distinct advantage for thoroughly fire-proofing the sulphur and rendered particularly desirable because of the extreme rarity of substances of any sort, let alone fire-proofing, which are known to be at all readily miscible with molten sulphur.

With these and other objects in view, I have discovered that the requirements sought are found in diphenyl and certain derivatives thereof, viz., the chlorinated diphenyls. Not only do these compounds exhibit a marked fire-proofing effect upon elemental sulphur, but they are either easily fusible or, as in some instances, normally liquid, and are readily miscible with molten sulphur.

While diphenyl alone accomplishes very satisfactory fire-proofing of the sulphur, the chlorinated diphenyls are even more effective as fire-proofing agents therefor. These chlorinated derivatives form a series of what might be deemed synthetic resins, varying in character from mobile, water-white oils of high boiling point to solids. In their pure state, these resins are transparent, have high boiling points and, with the exception of those oils which are water-white, are light amber in color. The chlorine content of these various chlorinated diphenyls may vary over a rather wide but nevertheless effective range, for example, from about 19% to 68%. In general, however, it appears that the higher the chlorine content, the more effective the fire-proofing action upon the sulphur.

However, the fire-proofing agent may, as desired, consist of diphenyl alone, of a particular chlorinated diphenyl alone, or of a mixture of different chlorinated diphenyls, or a mixture of diphenyl with one or more chlorinated diphenyls.

In carrying out the method of my invention, the selected fire-proofing agent in suitable amount is preferably intimately admixed with the sulphur while both are in a fluid condition. To this end, of course, it will first be necessary to melt the sulphur to convert it to suitably fluid form and, likewise, diphenyl and those of the chlorinated diphenyls which are normally solids. Due to the ready miscibility of these compounds with the sulphur, a very uniform liquid mixture of the sulphur and fire-proofing agent is obtainable which will evidence little, if any, separation or stratification of the constituent ingredients upon solidification.

While, in general, it is preferable to accomplish the fire-proofing of the sulphur by admixing the fire-proofing agent therewith while both are in fluid form, in order to thereby secure the uniform distribution of the agent which its ready miscibility with sulphur makes possible, the operation may be carried out in other manners if desired. For example, the molten or normally liquid agent may be simply sprayed or brushed upon, or otherwise applied to the sulphur while the latter is in solid form. This manner of application is quite effective where it is sought to apply a fire-proof coating simply upon the surface of large blocks or lumps of sulphur, sulphur in storage bins or other large masses.

For obtaining a particularly effective and economical fire-proof coating upon the surface of such block or lump sulphur, sulphur in storage bins and the like, I have found that excellent results are obtained if the solid sulphur is sprayed or brushed not with the fire-proofing agent alone, but with a mixture of molten fire-proofing agent and molten sulphur. Upon solidification, a protective fire-proof coating of uniform constitution will be obtained which is very firmly cemented to the main body of sulphur due to the interconnecting influence of the sulphur in the coating mixture.

In lieu of utilizing a spraying or brushing operation for the application of a fire-proof surface coating, the sulphur may, if it is in a form to be conveniently handled thereby, be simply dipped in, or carried on a conveyor through a bath composed either of the fire-proofing agent alone or a molten mixture thereof with sulphur.

If instead of a coating confined more or less to the surface of the sulphur, a fairly thorough distribution of fire-proofing agent throughout an unmelted body of sulphur is sought, this may be obtained by first reducing the solid sulphur to a suitable state of sub-division, and then treating it with the fire-proofing agent under conditions which will afford suitable infusion or dissemination of the agent. This may be accomplished, for example, by cascading the sulphur between opposed sprays of molten or normally liquid agent or mixtures thereof with molten sulphur, or by spreading out the sulphur in a suitably thin layer on a traveling conveyor or a stationary surface and spraying or otherwise applying the molten or normally liquid agent thereto.

Where it is sought to obtain a finely-divided sulphur product which is fire-proof for example fire-proof "flowers of sulphur", a special problem is presented. If it is attempted to treat finely divided sulphur directly either by spraying or similarly applying the molten or normally liquid fire-proofing agent, or mixtures thereof with molten sulphur, the sulphur particles will tend to agglomerate, with resultant loss of the finely divided form. In seeking a solution to this problem, I have found that finely divided sulphur which is effectively fire-proofed may be produced by first forming an intimate fluid mixture of molten sulphur and molten fire-proofing agent, and then atomizing the mixture in the form of a fine spray into a cooling atmosphere, in which solidification of the sprayed particles will take place. This operation may be conducted, for example, by spraying the mixture into the top of a cooling tower, through which a current of cooling air or other gas is passing either in concurrent or countercurrent relationship to the sprayed particles. The height of the tower and/or the rate of flow of the particles should be so regulated, with respect to the time to which the particles are subjected to the cooling atmosphere, that in their downward passage the individual particles will be solidified and sufficiently cooled by the time they reach the bottom of the tower that they will not tend to agglomerate when they come together at that point.

The high degree of miscibility of the molten diphenyl and chlorinated diphenyls with molten sulphur, lends itself particularly well to the spray-cooling operation, and a uniformly fire-proofed, high-grade product is obtained, which consists of very small spherical particles adapted for easy handling and packaging. Moreover, by proper control of the cooling conditions, the fineness of the spray, the fluidity of the mixture to be sprayed, etc., the size of the spherical particles may be varied as desired over rather a wide range.

In the foregoing I have described the production of fire-proof sulphur products per se. As for the procedure where various materials are to be treated with sulphur fire-proofed in the manner noted, this will vary with the particular material and other circumstances involved. Where porous pulp and paper products, wood, or other porous materials which are commonly impregnated with elemental sulphur, are to be treated, the porous material is preferably impregnated with a fluid mixture of molten sulphur and molten or normally liquid fire-proofing agent, and the mixture permitted to solidify therein after suitable penetration into the pores. If the porous material is already impregnated with sulphur and it is desired to fire-proof the same in situ, the material may simply be subjected to an auxiliary impregnation with the molten or normally liquid fire-proofing agent alone.

Where the sulphur is to be used together with other materials such as inert fillers, etc. for the formation of compositions, the sulphur is preferably first treated with the fire-proofing agent to form a uniform fluid mixture, and the mixture incorporated into the composition, either after solidification or while still in fluid form as the nature and manner of preparation of the composition may dictate. In the preparation of many sulphur compositions, the finely divided form of fire-proofed sulphur produced as hereinbefore described, may be very advantageously used. If the sulphur to be treated is already incorporated in the composition, it may still be subjected to the fire-proofing treatment if the composition of which it forms a part is fusible. Under such circumstances, the composition is melted and the molten or normally liquid fire-proofing agent incorporated therein.

The proportion of fire-proofing agent to sulphur in the various methods of application and uses noted, will of course vary over rather a wide range, depending upon whether it is used for surface coating, or in a state of admixture throughout the body of the sulphur; upon the mode of application of the agent to the sulphur; the particular agent or agents chosen; the degree of fire-proofing desired; the particular use to which the fire-proofed sulphur is to be directed; and other factors. In admixture with sulphur, the content of fire-proofing agent will in general, however, range between approximately 1% and 50% of the weight of the mixture.

As has been indicated in the foregoing, the chlorinated diphenyls which are normally liquids may, in various applications, be used for fire-proofing the sulphur more or less as satisfactorily as the molten diphenyl and chlorinated diphenyls which are normally solids. These liquids likewise exhibit a high degree of miscibility with molten sulphur and their normal fluidity presents an advantage in the way of greater ease of application with less heating. For some purposes, however, the presence of such liquid in the final sulphur product may be undesirable because of the oleaginous moistness it imparts thereto. While it is possible to render this characteristic of the product less appreciable by using the liquid agent in suitably small amount and selecting an agent of high viscosity, it is in general the better procedure where moistness is undesirable to resort to the normally solid compounds, which can be readily converted to the molten state to facilitate their application and subsequently solidified by cooling.

One illustrative instance where moistness of the product would be undesirable is found in the case of the fire-proofed sulphur in finely divided form, produced for example, by spray-cooling a mixture of molten sulphur and fire-proofing agent as described hereinbefore. If a normally liquid fire-proofing agent were utilized in appreciable amount in such an operation, the moistness of the resulting product would favor agglomeration of the particles and loss of the finely divided form desired. Consequently, in the production of the finely divided fire-proofed sulphur, it is preferable to use the normally solid fire-proofing compounds, which can be intimately incorporated while in the molten state and subsequently solidified by the spray-cooling of the mixture. Another example where the normally liquid agents would be less effective than the fusible solids is in the application of a mixture of molten sulphur and fire-proofing agent for the surface coating of block sulphur and the like. Due to the non-solidification of the normally liquid fire-proofing compounds, a coating mixture containing the same would be less firmly bonded to the body of the sulphur when the molten sulphur in the mixture solidifies than would a mixture containing the solidifiable fire-proofing compounds.

By proceeding as herein described the objectionable combustibility of elemental sulphur can be very effectively suppressed in a simple and economical manner, and a product obtained which is relatively incombustible and, in addition, substantially protected against the destructive action of fire or flame thereupon. Moreover, the readily fusible or normally liquid nature of the particular fire-proofing agents used, as well as their ready miscibility with sulphur, lends itself very advantageously not only to the fire-proofing of the sulphur per se but also to the facile application of such fire-proofed sulphur in certain uses. One example of such is found in the impregnation of wood or other porous material; another is found in the use of such sulphur in various surface coating applications.

While I have noted various specific modes of procedure for fire-proofing the sulphur, however, both as regards sulphur by itself and in certain of its uses, the same are intended simply to be illustrative and not limiting, and variations in the procedures as well as numerous other applications of the product or treatment may be made as will be apparent to one skilled in the art.

I claim:

1. The method of fire-proofing sulphur which comprises, treating the sulphur with an agent of the nature of the group: diphenyl-halogenated diphenyl.

2. The method of fire-proofing sulphur which comprises, treating the sulphur with diphenyl.

3. The method of fire-proofing sulphur which comprises, treating the sulphur with halogenated diphenyl.

4. The method of fire-proofing sulphur which comprises, mixing molten sulphur and a fluid agent of the group: diphenyl-chlorinated diphenyl.

5. The method of fire-proofing sulphur which comprises, mixing molten sulphur and a molten agent of the group: diphenyl-chlorinated diphenyl.

6. The method of fire-proofing sulphur which comprises, mixing molten sulphur and normally liquid chlorinated diphenyl.

7. The method of fire-proofing sulphur which comprises, mixing molten sulphur and molten diphenyl.

8. The method of fire-proofing sulphur which comprises, mixing molten sulphur and molten chlorinated diphenyl.

9. The method of fire-proofing sulphur which comprises, preparing a mixture of molten sulphur and fluid agent of the group: diphenyl-chlorinated diphenyl, disseminating the mixture into a spray, and cooling the spray to solidify the particles thereof.

10. The method of fire-proofing sulphur which comprises, preparing a mixture of molten sulphur and molten agent of the group: diphenyl-chlorinated diphenyl, disseminating the mixture into a spray, and cooling the spray to solidify the particles thereof.

11. The method of fire-proofing sulphur which comprises, preparing a mixture of molten sulphur and molten diphenyl, disseminating the mixture into a spray, and cooling the spray to solidify the particles thereof.

12. The method of fire-proofing sulphur which comprises, preparing a mixture of molten sulphur and molten chlorinated diphenyl, disseminating the mixture into a spray, and cooling the spray to solidify the particles thereof.

13. The method of fire-proofing sulphur which comprises, coating the sulphur with an agent of the group: diphenyl-chlorinated diphenyl.

14. The method of fire-proofing sulphur which comprises, coating the sulphur with a fluid agent of the group: diphenyl-chlorinated diphenyl.

15. The method of fire-proofing sulphur which comprises, coating the sulphur with a normally liquid chlorinated diphenyl.

16. The method of fire-proofing sulphur which comprises, coating the sulphur with a molten agent of the group: diphenyl-chlorinated diphenyl, and solidifying the coating.

17. Fire-proofed sulphur which comprises, sulphur and an agent of the group: diphenyl-halogenated diphenyl.

18. Fire-proofed sulphur which comprises, sulphur and diphenyl.

19. Fire-proofed sulphur which comprises, sulphur and chlorinated diphenyl.

20. Fire-proofed sulphur which comprises, small, globular particles consisting of solid sulphur and an agent of the group: diphenyl-chlorinated diphenyl.

In testimony whereof I affix my signature.

WILLIAM H. KOBBÉ.